United States Patent Office 3,564,095
Patented Feb. 16, 1971

3,564,095
ANTI-INFLAMMATORY HYDROXY CYCLIC SULFONES
Lewis H. Sarett, Princeton, Tsung-Ying Shen, Westfield, and Conrad P. Dorn, Jr., Plainfield, N.J., assignors to Merck & Co., Inc., Rahway, N.J., a corporation of New Jersey
No Drawing. Continuation-in-part of application Ser. No. 476,695, Aug. 2, 1965. This application June 21, 1968, Ser. No. 738,800
Int. Cl. A01n 9/12
U.S. Cl. 424—275
2 Claims

ABSTRACT OF THE DISCLOSURE

This invention relates to certain cyclic hydroxy alkylene sulfones and their method of preparation. These compounds have been found to exhibit pharmaceutical activity as anti-inflammatory agents.

CROSS-REFERENCES TO RELATED APPLICATIONS

This application is a continuation-in-part of U.S. Ser. No. 476,695, filed Aug. 2, 1965 now abandoned.

This invention relates to certain sulfones and to their new pharmaceutical and related uses. In addition, this invention relates to the preparation of these sulfones.

The sulfones of this invention represent a series of compounds in the continuing search for new potent anti-inflammatory agents. In addition, such anti-inflammatory activity which, as used herein, includes anti-pyretic and analgesic potency.

It is an object of this invention to provide a method of treatment of inflammation and associated pain and fever. It is also an object of this invention to provide analgesic and anti-pyretic methods for the relief and treatment of pain and fever not symptomatically related to an inflammatory indication. Another object is to provide an entirely new class of anti-inflammatory analgesic and anti-pyretic compositions.

It is also an object of this invention to provide methods for the treatment of various other disease conditions or symptoms, as more fully described hereinafter by the administration in pharmaceutically acceptable form of the sulfones of this invention.

A still further object is to provide methods for the preparation of these sulfones and also to provide means and methods for their formulation.

The above and other objects of this invention are accomplished by treatment of a mammalian indication, or disease condition, symptomatically evidenced by pain, fever and inflammation, either as essential or concomitant phenomena of the disease, which comprises the administration in dosage unit form of a pharmaceutically acceptable composition containing a therapeutically effective amount of a cyclic hydroxy alkylene sulfone, wherein said hydroxy is preferably substituted at a position other than α to the sulfone moiety, such as 3-hydroxy tetrahydrothiophene-1,1-dioxide.

The sulfones of this invention can be represented by the following formula:

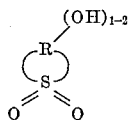

wherein R is a cycloaliphatic radical containing at least 3 carbon atoms, preferably propylene, tetramethylene, 1,5-pentylene, 1,6-hexylene; the hydroxy groups in the foregoing formula being substituted at any carbon atom of said cycloaliphatic radical and generally other than the α carbon atom, and preferably substituted at the β carbon position and having a sum of 1–2.

It is preferred that the cycloaliphatic radical contain about 3–8 carbon atoms.

Also included within the scope of this invention are hydroxy sulfones having the following formula:

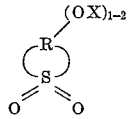

wherein R is as defined above, and X is hydrogen and/ or an acyl group, preferably containing up to about 6 carbon atoms, such as acetyl, propionyl, butyryl, pentanoyl and hexanoyl. The following compounds are illustrative: 3-hydroxy tetrahydrothiophene - 1,1 - dioxide acetonide; and 3-hydroxy tetrahydrothiophene - 1,1 - dioxide acetate.

A preferred embodiment of this invention is a method of treating a disease which is symptomatically characterized by pain, fever and/or inflammation which comprises the administration in dosage unit form of between about 0.01 and 5 gm. of the hydroxy sulfone per day. On a kilogram basis, it is preferred to utilize between about 0.5 mg./kg. and 70 mg./kg. per day of the hydroxy sulfones of this invention. 3-hydroxy tetrahydrothiophene - 1,1 - dioxide is the preferred hydroxy sulfone of this invention.

The hydroxy sulfone active ingredients of the compositions of this invention demonstrated significant anti-inflammatory activity in the Carrageenan foot edema test carried out according to the procedure set forth in the Proc. Soc. Exp. Biol. Med. 3: 544–47 (1962) in which rats are given orally the compounds to be tested.

The hydroxy sulfone active ingredients of the compositions of this invention can also be shown to demonstrate significant anti-inflammatory, analgesic and anti-pyretic properties. For example, anti-inflammatory activity is shown by the inhibition of granuloma, as described in the paper of Winter & Porter, J. Am. Pharm. Assoc. 46: 515 (1957) in which rats are given orally the compound to be tested. Analgesic activity is also shown by antinociceptive testing by the inflamed foot technique of Randall & Selitto, Arch. Int. Pharmacodyn. 11: 409 (1957), as modified by Gilfoil et al. (1963) and Winter et al. (1965) in which rats are given orally the compounds to be tested.

An analgesic effect is also demonstrated in the treatment of arthritis induced hyperesthesia, utilizing a promising, extremely sensitive technique which quantitatively records vocalization reduction. In addition, the sulfones of this invention exhibit significant anti-pyretic activity in yeast-induced fever tests. Such anti-inflammatory, analgesic and anti-pyretic activity can be demonstrated for the active sulfone ingredients of this invention, e.g., 3-hydroxy tetrahydrothiophene - 1,1 - dioxide, and the like.

In view of the fact that the novel sulfones of this invention exercise anti-inflammatory, analgesic and anti-pyretic activity, in general they are indicated for a wide variety of mammalian conditions where one or more of the symptoms of inflammation, fever and pain are manifested. Exemplary of such conditions are rheumatic diseases, for example, rheumatoid arthritis, osteoarthritis and other degenerative joint diseases, psoriatic arthritis, ankylosing spondylitis, gout and rheumatic fever; soft-tissue rheumatism, for example, tendinitis, periarthritis and periostitis; acute muscular rheumatism, for example, sciatica and the like; certain cases of malignant conditions (e.g., carcinomata, leukemia), thrombophlebitis, varicose ulcers, diabetes, infections and allergic responses thereto, treatment of pain after fractures, pain and inflammation associated with dental surgery, and the like, human and veterinary disease conditions exhibiting the foregoing symptoms requiring the use of an anti-inflammatory, analgesic and/or anti-pyretic pharmaceutical composition.

The compounds of this invention may be in a form suitable for oral use, for example, as tablets, aqueous or oil suspensions, dispersible powders or granules, emulsions, hard or soft capsules, or syrups or elixir. Compositions intended for oral use may be prepared according to any method known to the art for the manufacture of pharmaceutical compositions and such compositions may contain one or more agents selected from the group consisting of sweetening agents, flavoring agents, coloring agents and preserving agents, in order to provide a pharmaceutically elegant and palatable preparation. Tablets contain the active sulfone ingredient in admixture with non-toxic pharmaceutically acceptable excipients which are suitable for the manufacture of tablets. These excipients may be, for example, inert diluents, for example, calcium carbonate, sodium carbonate, lactose, calcium phosphate or sodium phosphate granulating and disintegrating agents, for example, maize starch or alginic acid; binding agents, for example, starch, gelatin or acacia; and lubricating agents, for example, magnesium stearate, stearic acid or talc. The tablets may be uncoated or they may be coated by known techniques to delay disintegration and absorption in the gastro-intestinal tract and thereby provide a sustained action over a longer period.

Formulations for oral use may also be presented as hard gelatin capsules wherein the active ingredient is mixed with an inert solid diluent, for example, calcium carbonate, calcium phosphate or kaolin, or as soft gelatin capsules wherein the active ingredient is mixed with an oil medium, for example, arachis oil, liquid paraffin or olive oil.

Since the hydroxy sulfones of this invention are generally water-soluble, aqueous solutions containing the active sulfone form a preferred embodement of this invention. Although in view of such water-solubility it is not necessary to use excipients suitable for aqueous suspensions, such may be employed if desired. These excipients are suspending agents, for example, sodium carboxymethylcellulose, methylcellulose, hydroxypropylmethyllulose, sodium alginate, polyvinylpyrrolidone, gum tragacanth and gum acacia; dispersing or wetting agents may be a naturally-occurring phosphatide, for example, lecithin; or condensation products of an alkylene oxide with fatty acids, for example, polyoxyethylene stearate; or condensation products of ethylene oxide with long-chain aliphatic alcohols, for example, heptadecaethyleneoxy-cetanol; or condensation products of ethylene oxide with patrial esters derived from fatty acids and a hexitol, for example, polyoxyethylene sorbitol mono-oleate; or condensation products of ethylene oxide with partial esters derived from fatty acids and hexitol anhydrides, for example, polyoxyethylene sorbitan mono-oleate. The said aqueous suspensions may also contain one or more preservatives, for example, ethyl, or n-propyl, p-hydroxy benzoate, one or more coloring agents, one or more flavoring agents, and one or more sweetening agents, such as sucrose, saccharin, or sodium or calcium cyclamate.

Oily suspensions may be formulated by suspending the active ingredient in a vegetable oil, for example, arachis oil, olive oil, sesame oil or coconut oil, or in a mineral oil, such as liquid paraffin. The oily suspensions may contain a thickening agent, for example, beeswax, hard paraffin or cetyl alcohol. Sweetening agents, such as those set forth above, and flavoring agents may be added to provide a palatable oral preparation. These compositions may be preserved by the addition of an anti-oxidant such as ascorbic acid.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example, sweetening, flavoring and coloring agents, may also be present.

The compounls of this invention may also be in the form of oil-in-water emulsions. The oily phase may be a vegetable oil, for example, olive oil or arachis oils, or a mineral oil, for example, liquid paraffin or mixtures of these Suitable emulsifying agents may be naturally-occurring gums, for example, gum acacia or gum tragacanth, naturally-occurring phosphatides, for example, soya bean lecithin, and esters of partial esters derived from fatty acids and hexitol anhydrides, for example, sorbitan mono-oleate, and condensation products of the said partial esters with ethylene oxide, for example, polyoxyethylene sorbitan mono-oleate. The emulsions may also contain sweetening and flavoring agents.

Syrups and elixirs may be formulated with sweetening agents, for example, glycerol, sorbitol or sucrose. Such formulations may also contain a demulcent, a preservative and flavoring and coloring agents. The pharmaceutical compositions may be in the form of a sterile injectable preparation, for example, as a sterile injectable aqueous suspension. This suspension may be formulated according to the known art using those suitable dispersing or wetting agents and suspending agents which have been mentioned above. The sterile injectable preparation may also be a sterile injectable solution or suspension in a non-toxic parenterally-acceptable diluent or solvent, for example, as a solution in 1:3-butane diol.

The sulfones of this invention may also be in the form of suppositories for rectal administration of the drug. These can be prepared by mixing the drug with a suitable non-irritating excipient which is solid at ordinary temperatures, but liquid at the rectal temperature and will therefore melt in the rectum to release the drug. Such materials are cocoa butter and polyethylene glycols.

Further, these sulfone compounds may be tableted or otherwise formulated so that for every 100 parts by weight of the composition, there are present between 5 and 95 parts by weight of the active ingredient, and preferably between 25 and 85 parts by weight of the active ingredient. The dosage unit form will generally contain between about 100 mg. and about 500 mg. of the active ingredient of the formula stated above.

From the foregoing formulation discussion, it is apparent that the compounds of this invention can be administered orally, parenterally, and rectally. The term parenteral as used herein includes subcutaneous injection, intravenous, intramuscular, or intrasternal injection or infusion techniques.

The dosage regimen in carrying out the methods of this invention is that which insures maximum therapeutic response until improvement is obtained and thereafter is the minimum effective level which gives relief. Thus, in general, the dosage are those that are therapeutically effective in the treatment of disease conditions or symptoms, such as inflammation, pain and fever. In general, the daily dose can be between about 0.5 mg./kg. and 70 mg./kg., bearing in mind, of course, that in selecting the appropriate dosage in any specific case, consideration must be given to the patient's weight, general health, age, and other factors which may influence response to the drug.

It is expected that the sulfones of this invention will generally be administered in dosage units of between 5 and 500 mg. of active ingredient. Preferred compositions for ease of administration are in oral dosage unit form, for example, tablets or capsules, containing between 25 and 500 mg. of a sulfone of this invention.

This invention is further demonstrated by the following examples in which all parts are by weight.

EXAMPLE 1

A mixture of 25, 100 or 500 parts of 3-hydroxy tetrahydrothiophene-1,1-dioxide and 25 parts of lactose is granulated with suitable water, and to this is added 100 parts of maize starch. The mass is passed through a 16 mesh screen. The granules are dried at a temperature below 60° C. The dry granules are passed through a 16 mesh screen, and mixed with 3.8 parts of magnesium stearate. They are then compressed into tablets suitable for oral administration.

EXAMPLE 2

A mixture of 50 parts of 3-hydroxy tetrahydrothiophene-1,1-dioxide, 3 parts of the calcium salt of lignin sulphonic acid, and 237 parts of water is ball-milled until the size of substantially all of the particles of the sulfone is less than 10 microns. The suspension is diluted with a solution containing 3 parts of sodium carboxymethyl cellulose and 0.9 part of the butyl ester of p-hydroxy benzoic acid in 300 parts of water. There is thus obtained an aqueous suspension suitable for oral administration for therapeutic purposes.

The hydroxysulfones (or sulfonyl alcohols) of this invention may be prepared by controlled oxidation of the thio alcohols. Complete oxidation of the thio group in these compounds produces the sulfonyl derivatives, while partical controlled oxidation produces the corresponding sulfonyl alcohols.

The oxidation of the thio alcohols may be effected by any of a large number of oxidizing agents, such as peroxides, as hydrogen peroxide, sodium and potassium perbenzoates, permanganates, bromides, fuming nitric acid, chromic acid, and perbenzoic acid. The amount of the oxidizing agent to be employed will vary over a considerable range. If the sulfonyl alcohol is the desired product, it is generally desirable to react the thio alcohol with an approximate chemical equivalent amount of the oxidizing agent. As used throughout the specification, the expression "chemical equivalent amount" refers to the amount of agent necessary to furnish one atom of oxygen for every thio ether linkage to be oxidized. Preferably, the thio alcohol and agent are reacted in chemical equivalent ratios of 1:1 to 1:1.5, respectively. The acetonide derivatives of the hydroxy sulfones of this invention can be prepared by reacting the sulfonyl alcohol (i.e., glycol) or corresponding epoxide with the corresponding ketone, for example (e.g., acetone in the case of the acetonide) under anhydrous acid conditions. It is preferred, however, to prepare the acetonide from the dioxalane sulfide followed by oxidation as described above.

The oxidation may be accomplished in the presence or absence of solvents or diluents. Examples of suitable diluents are glacial acetic acid, benzene, toluene, xylene, and the like. The temperature employed during the oxidation may vary over a considerable range, depending upon the reactants and oxidizing agent employed. It is generally desirable to maintain the temperature between 50° C. and 150° C., preferably 60° C. and 100° C. Cooling may be employed if necessary. Atmospheric, superatmospheric, or subatmospheric pressures may be employed as desired. The sulfonyl alcohols in the reaction may be recovered by any suitable method, such as distillation, fractional precipitation, and the like.

Although the foregoing discussion has been directed to methods for the treatment of anti-inflammatory conditions and to compositions therefor, as was stated at the beginning, the hydroxy sulfones of this invention has a wide range of other pharmaceutical uses.

We claim:

1. A method of treating a disease exhibiting at least one of the symptoms of pain, fever and inflammation which comprises the oral and parenteral administration in unit dosage form to a patient afflicted with a disease exhibiting at least one of said symptoms of a pharmaceutically acceptable composition consisting essentially of as an active ingredient an anti-inflammatory effective amount of a compound having the following general formula:

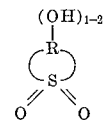

wherein R is an alkylene radical containing between about 3 and 8 carbon atoms.

2. The method of claim 1 wherein said compound is 3-hydroxy tetrahydrothiophene-1,1-dioxide.

References Cited

UNITED STATES PATENTS 3,098,793   7/1963   Loev _____ 424—275X

SHEP K. ROSE, Primary Examiner